United States Patent [19]

Geiger

[11] Patent Number: 4,497,713
[45] Date of Patent: Feb. 5, 1985

[54] METHOD OF INHIBITING CORROSION AND DEPOSITION IN AQUEOUS SYSTEMS

[76] Inventor: Gary E. Geiger, 4156 Whiting Rd., Philadelphia, Pa. 19154

[21] Appl. No.: 364,562

[22] Filed: Apr. 1, 1982

[51] Int. Cl.³ .................................................. C02F 5/14
[52] U.S. Cl. ................................... 210/699; 210/698; 210/700; 252/181 A; 422/15; 422/19; 252/389 A
[58] Field of Search ............... 210/698–700; 252/180, 181, 389 R, 389 A, 389.2, 389.21, 389.22, 389.52; 422/15, 16, 19

[56] References Cited

U.S. PATENT DOCUMENTS

| | | | |
|---|---|---|---|
| 2,970,959 | 2/1961 | Jones | 252/181 |
| 3,188,289 | 6/1965 | Kahler et al. | 210/698 |
| 3,483,133 | 12/1969 | Hatch et al. | 422/16 |
| 3,803,048 | 4/1974 | Hwa | 252/181 |
| 3,837,803 | 9/1974 | Carter et al. | 422/13 |
| 3,959,168 | 5/1976 | Germscheid et al. | 210/700 |
| 4,149,969 | 4/1979 | Robitaille et al. | 422/16 |
| 4,209,398 | 6/1980 | Ii et al. | 210/699 |
| 4,239,648 | 12/1980 | Marshall et al. | 422/15 |
| 4,255,259 | 3/1981 | Hwa et al. | 210/700 |

FOREIGN PATENT DOCUMENTS 794057 1/1981 U.S.S.R. ............................... 252/180

Primary Examiner—Peter A. Hruskoci

[57] ABSTRACT

A corrosion inhibition and scale control method and composition are disclosed. The method comprises, adding to a cooling water system, for which protection is desired, a water soluble zinc salt, a cellulose gum material and an organo-phosphorus acid compound. Optionally, a corrosion inhibitor compound such as a 1,2,3-triazole or thiazole compound may be added to afford additional protection. Molybdate salts may also be included as optional corrosion inhibitors.

11 Claims, No Drawings

METHOD OF INHIBITING CORROSION AND DEPOSITION IN AQUEOUS SYSTEMS

The present invention relates to a composition and method for inhibiting corrosion and scale deposition of metallic surfaces in water carrying systems, and more particularly, to the prevention of corrosion and scale in recirculating cooling water systems. Specifically, the invention relates to the use of a composition comprising a soluble zinc salt, a water soluble cellulose gum polymer, and an organo-phosphorus acid component or water soluble salt thereof. Optionally an azole compound or a soluble molybdate salt may be added for increased corrosion protection.

The compositions of the present invention have been found effective for simultaneously controlling both corrosion and scaling deposition in a wide variety of cooling water systems and are exceptionally effective in those cooling water systems having a high scaling potential and operating under low flow and/or high heat load conditions. Heretofore, these latter conditions have made it difficult, if not impossible, to effectively and economically prevent both corrosion and the formation of scales simultaneously.

The term "cooling water" is applied wherever water is circulated through equipment to absorb and carry away heat. This definition includes air conditioning systems, engine jacket systems, refrigeration systems as well as the multitudes of industrial heat exchange operations, such as found in oil refineries, chemical plants, steel mills, etc.

The use of a recirculating system, in which a cooling tower, spray pond, evaporative condenser and the like serve to dissipate heat, permits great economy in make-up water requirements. In a cooling water system employing a cooling tower, water is circulated through the heat transfer equipment and subsequently cooled by evaporation of a part of the circulating water as the water is passed over the cooling tower. By virtue of the evaporation which takes place in cooling, the dissolved solids and suspended solids in the water become concentrated. The circulating water becomes more concentrated than the make-up water due to this evaporation loss.

"Cycles of concentration" is the phrase employed to indicate the degree of concentration of the circulating water as compared with the make-up. For example, 2.0 cycles of concentration indicates the circulating water is twice the concentration of the make-up water. To maintain the circulating water at some given cycles of concentration, a portion of the circulating water must be physically removed from the system and replaced with fresh make-up water to maintain a steady-state condition. The circulating water removed from the system is referred to as "blowdown".

The make-up water employed for recirculating systems is obtained from surface or well water sources. These waters normally contain a variety of dissolved salts, the abundance and composition of which will, of course, depend on the source of the make-up water. Generally, the make-up water will contain a preponderance of the alkaline earth metal cations, primarily calcium and magnesium, and such anions as silicate, sulfate, bicarbonate and carbonate. As the water is concentrated by the evaporative process, precipitation of cation/anion combination, e.g., calcium carbonate, calcium silicate, magnesium silicate, etc., will occur whenever the solubility of the particular cation/anion combination is exceeded. If the precipitation (crystallization) occurs at a metallic surface and adheres to it, the resultant deposit is referred to as "scale". Some of the factors which affect scale formation are temperature, rate of heat transfer, water velocity, the dissolved solids concentration, cycles of concentration, system retention time and pH of the water.

Some naturally occurring waters have similar scaling potentials in their uncycled state.

Preventing the corrosion and scaling of industrial heat transfer equipment is essential to the efficient and economical operation of a cooling system. Excessive corrosion of metallic surfaces can cause the premature failure of process equipment, necessitating down time for the replacement or repair of the equipment. Additionally, the buildup of corrosion products on heat transfer surfaces impedes water flow and reduces heat transfer efficiency, thereby limiting production or requiring down time for cleaning. Reduction in efficiency will also result from scaling deposition which retards heat transfer and hinders water flow.

Scale can also cause rapid localized corrosion and subsequent penetration of metallic surfaces through the formation of differential oxygen concentration cells. The localized corrosion resulting from differential oxygen cells originating from deposits is commonly referred to as "under-deposit corrosion".

With the advent of strict Federal, State and Municipal environmental controls and water shortages throughout the country, recirculating cooling water systems were, in many cases, forced to operate at higher cycles of concentration to reduce both water consumption and the volume of blowdown from the system. As the cycles of concentration increase, scaling and corrosion problems become more severe because of the higher dissolved salt concentrations that are encountered. Generally, the cooling water is prone to produce scaling than corrosion at the more alkaline pH's, pH>7.5, while at near neutral pH's, pH=6 to 7.5, the cooling water is more prone to corrosion than scaling.

To avoid scaling problems, acid can be added to the cooling water to maintain the pH within a range where scaling can be controlled. However, the addition of acid, normally sulfuric or hydrochloric acid, increases the concentration of the aggressive chloride or sulfate ions and thus aggravates the corrosion problem. When acid is added, its addition must be carefully regulated since overfeeds can depress the pH to the point where severe corrosion can result, while underfeeds could allow the pH to increase to the point where scaling cannot be controlled.

PRIOR ART

The use of organo-phosphorus acid compounds as corrosion and scale inhibitors in aqueous systems is well known. The use of carboxymethylcellulose to prevent or reduce deposits in boiler systems and the like is also known as shown in U.S. Pat. No. 3,188,289 (Kahler et al).

As corrosion inhibitors for cooling water systems the organo-phosphorus acid compounds alone do not perform satisfactorily and require additional components to improve the corrosion control capabilities. U.S. Pat. Nos. 3,837,803, 4,149,969, and 3,803,048 can be noted as disclosing use of such phosphorus acid compounds.

When the phosphorus acid compounds are combined with commonly used corrosion inhibitors, e.g., inorganic phosphate, zinc, etc., improved corrosion control is obtained. However, these combinations are limited in their ability to simultaneously control corrosion and maintain heat transfer surfaces free of scale. Furthermore, the degree of corrosion and scaling protection that can be achieved with the organo-phosphorus acid combinations is dependent on both the cooling water chemistry (pH, calcium hardness, carbonate and bicarbonate concentrations) and the cooling system operating conditions (water velocity, heat load, water temperature, cycles of concentration).

The performance of treatment programs containing combinations of zinc and organo-phosphorus acid compounds is particularly dependent on the cooling water chemistry and operating conditions since both the zinc and the organo-phosphorus acid compounds can precipitate as insoluble salts and thereby adversely affect corrosion and scaling control. Zinc becomes exceedingly insoluble with increasing temperature and pH. Precipitation of the soluble zinc in the cooling water minimizes or eliminates the ability of the zinc to fulfill its intended corrosion inhibition function. Additionally, the precipitation and deposition of insoluble zinc salts at hot heat transfer surfaces can retard heat transfer and cause under-deposit corrosion. Precipitation of insoluble calcium phosphonate can also occur in waters sufficiently high in pH and/or calcium hardness. Similar to the precipitation of zinc, the solubility of the calcium phosphonate salts decreases with increasing pH and temperature. Precipitation of phosphonate in the circulating water can reduce the phosphonate concentration below that which is required for effective scaling suppression and thereby result in excessive scaling from naturally occuring salts, e.g., calcium carbonate. Scaling, and the attendant under-deposit corrosion, caused by calcium phosphonate salts, can also occur at the heat transfer surface by virtue of the higher temperatures that exist there. Due to the limited solubility of both the phosphonate and zinc salts, at any given condition of pH, temperature, calcium hardness, etc., the concentration of both the organo-phosphorus acid component and zinc salts must be stingently controlled, since overfeeds of either material can cause chemical scaling, while underfeeds can result in corrosion and/or scaling from naturally occurring salts. Conversely, at any given concentration of zinc and phosphonic acid compound, the water chemistry and system operating parameters must be closely controlled to avoid potential problems.

The aforementioned problems encountered with compositions containing zinc salts and phosphonic acid components are particularly troublesome with cooling water systems operating at alkaline pH, generally pH≧8, and having high calcium carbonate scaling potentials.

Accordingly, there is a need in the art to provide a treatment program which can effectively and simultaneously inhibit corrosion and scaling of metallic surfaces in cooling water systems of high scaling potential.

DESCRIPTION OF THE INVENTION

It has surprisingly been discovered that a treatment program incorporating (1) a water soluble zinc salt, (2) a water soluble cellulose gum polymer material, (3) an organo-phosphorus acid compound, and (4) optionally, an azole compound, and/or (5) a soluble molybdate salt, provides enhanced corrosion control in water systems, such as cooling water systems, without leading to the formation of excessive scale. The treatment program of the present invention has been found to be applicable to a wide variety of cooling water chemistries and is surprisingly effective in water systems having a high scaling potential.

Although the disclosed treatment program is extremely effective for cooling water systems operating at pH>8 and supersaturated with respect to calcium carbonate, it is generally applicable to cooling waters having a pH of about 7 to 9.5, and a Langelier Saturation Index of ≧.8. (See Betz, Handbook of Industrial Water Conditioning, Eighth Edition, 1980, pages 177–178.)

The organo-phosphorus acid compounds, useful in conjunction with the present invention, are those having a carbon to phosphorus bond, i.e.,

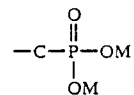

Compounds within the scope of the above description generally are included in one of perhaps 4 categories which are respectively expressed by the following general formulas (6, 7, 8, and 9):

where R is a lower alkyl having from about one to seven carbon atoms, e.g., methyl, ethyl, butyl, propyl, isopropyl, pentyl, isopentyl and hexyl heptyl; substituted lower alkyl of from one to seven carbon atoms, e.g., hydroxyl, carboxylated, and amino-substituted alkyls; a mononuclear aromatic (aryl) radical, e.g., phenyl, or a substituted mononuclear aromatic compound, e.g., hydroxyl, amino, lower alkyl substituted aromatic, e.g., tolylphosphonic acid; and M is a water-soluble cation, e.g., sodium, potassium, ammonium, lithium, etc. or hydrogen.

Specific examples of compounds which are encompassed by this formula include:

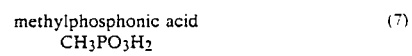
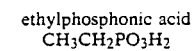

2-hydroxyethylphosphonic acid
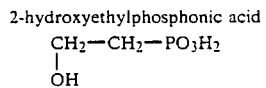

2-aminoethylphosphonic acid
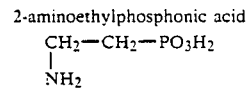

2-phosphonobutane 1,2,4-tricarboxylic acid
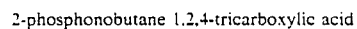
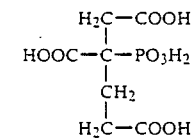

isopropylphosphonic acid
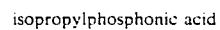
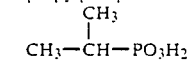

benzene phosphonic acid
$C_6H_5PO_3H_2$ benzylphosphonic acid
$C_6H_5CH_2PO_3H_2$

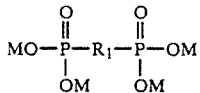

where $R_1$ is an alkylene having from about one to about 12 carbon atoms or a substituted alkylene having from about 1 to about 12 carbon atoms, e.g., hydroxyl, amino, etc., substituted alkyleness, and M is as earlier defined for (6) above.

Specific exemplary compounds and their respective formulas which are encompassed by the above formula (7) are as follows:

methylene diphosphonic acid (8)
$H_2O_3PCH_2PO_3H_2$ ethylidene diphosphonic acid
$H_2O_3PCH(CH_3)PO_3H_2$ isopropylidene diphosphonic acid
$(CH_3)_2C(PO_3H_2)_2$ 1-hydroxyethylidene 1,1-diphosphonic acid (HEDP)
$H_2O_3P-\underset{\underset{OH}{|}}{C}(CH_3)-PO_3H_2$ (This is preferred.)

hexamethylene diphosphonic acid
$H_2O_3PCH_2(CH_2)_4CH_2PO_3H_2$ trimethylene diphosphonic acid
$H_2O_3P(CH_2)_3PO_3H_2$ decamethylene diphosphonic acid
$H_2O_3P(CH_2)_{10}PO_3H_2$ 1-hydroxypropylidene 1,1-diphosphonic acid
$CH_3CH_2C(OH)(PO_3H_2)_2$ 1,6-dihydroxy-1,6-dimethylhexamethylene-1,6-diphosphonic acid
$H_2O_3PC(CH_3)(OH)(CH_2)_4C(CH_3)(OH)PO_3H_2$ 1,2-dihydroxy-1,2-diethylethylene-1,2-diphosphonic acid
$H_2O_3PC(OH)(C_2H_5)(OH)(C_2H_5)CPO_3H_2$

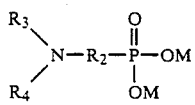

where $R_2$ is a lower alkylene having from about one to about four carbon atoms, or an amine or hydroxy substituted lower alkylene; $R_3$ is $[R_2\text{-}PO_3M_2]$, H, OH, $NH_2$, substituted amino, an alkyl having from one to six carbon atoms, a substituted alkyl of from one to six carbon atoms (e.g., OH, $NH_2$ substituted), a mononuclear aromatic radical and a substituted mononuclear aromatic radical (e.g., OH, $NH_2$ substituted); $R_4$ is $R_3$ or the group represented by the formula

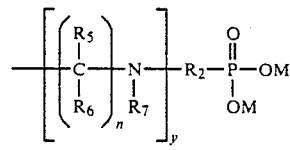

where $R_5$ and $R_6$ are each hydrogen, lower alkyl of from about one to six carbon atoms, a substituted lower alkyl (e.g., OH, $NH_2$ substituted), hydrogen, hydroxyl, amino group, substituted amino group, a mononuclear aromatic radical, and a substituted mononumclear aromatic radical (e.g., OH and amine substituted); $R_7$ is $R_5$, $R_6$, or the group $R_2-PO_3M_2$ ($R_2$ is as defined above); n is a number of from 1 through about 15; y is a number of from about 1 through about 14; and M is as earlier defined.

Compounds or formulas therefore which can be considered exemplary for the above formulas are as follows:

nitrilo-tris(methylene phosphonic acid)
$N(CH_2PO_3H_2)_3$
imino-di(methylene phosphonic acid)
$NH(CH_2PO_3H_2)_2$
n-butylamino-N,N—di(methylene phosphonic acid)
$C_4H_9N(CH_2PO_3H_2)_2$
decylamino-N,N—di(methylene phosphonic acid)
$C_{10}H_{21}N(CH_2PO_3H_2)_2$
trisodiumpentadecylamino-N,N—dimethylene phosphonate
$C_{15}H_{31}N(CH_2PO_3HNa)(CH_2PO_3Na_2)$
n-butylamino-N,N—di(ethylene phosphonic acid)
$C_4H_9N(CH_2CH_2PO_3H_2)_2$
tetrasodium-n-butylamino-N,N—di(methylene phosphonate)
$C_4H_9N(CH_2PO_3Na_2)_2$
triammonium tetradecylamino-N,N—di(methylene phosphonate)
$C_{14}H_{29}N(CH_2PO_3(NH_4)_2)CH_2PO_3HNH_4$
phenylaminodi-N,N—(methylene phosphonic acid)
$C_6H_5N(CH_2PO_3H_2)_2$
4-hydroxyphenylamino-N,N—di(methylene phosphonic acid)
$HOC_6H_4N(CH_2PO_3H_2)_2$
N—propylphenylamino-N,N—di(methylene phosphonic acid)
$C_6H_5(CH_2)_3N(CH_2PO_3H_2)_2$
tetrasodiummethylphenyl-N,N—aminodi(methylene phosphonic acid)
$C_6H_5(CH_2)_2N(CH_2PO_3Na_2)_2$
ethylene diamine-N,N,N',N'—tetra(methylene phosphonic acid)
$(H_2O_3PCH_2)_2N(CH_2)_2N(CH_2PO_3H_2)_2$
trimethylene diamine-N,N,N',N'—tetra(methylene phosphonic acid)
$(H_2O_3PCH_2)_2N(CH_2)_3N(CH_2PO_3H_2)_2$
heptamethylene diamine-N,N,N',N'—tetra(methylene phosphonic acid)
$(H_2O_3PCH_2)_2N(CH_2)_7N(CH_2PO_3H_2)_2$
decamethylene diamine-N,N,N',N'—tetra(methylene phosphonic acid)
$(H_2O_3PCH_2)_2N(CH_2)_{10}N(CH_2PO_3H_2)_2$
hexamethylene diamine-N,N,N',N'—tetra(methylene phosphonic acid)
$(H_2O_3PCH_2)_2N(CH_2)_6N(CH_2PO_3H_2)_2$
tetradecamethylenediamine-N,N,N',N'—tetra(methylene phosphonic acid)
$(H_2O_3PCH_2)_2N(CH_2)_{14}N(CH_2PO_3H_2)_2$
ethylenediamine-N,N,N'—tri(methylene phosphonic acid)
$(H_2O_3PCH_2)_2N(CH_2)_2NHCH_2PO_3H_2$
ethylenediamine-N,N'—di(methylene phosphonic acid).
$H_2O_3PCH_2NH(CH_2)_2NHCH_2PO_3H_2$
n-hexylamine-N,N—di(methylene phosphonic acid)
$C_6H_{13}(CH_2PO_3H_2)_2$
diethylenetriamine-N,N,N',N'',N'''—penta(methylene phosphonic acid)
$(H_2O_3PCH_2)_2N(CH_2)_2N(CH_2PO_3H_2)-(CH_2)_2N(CH_2PO_3H_2)_2$
ethanolamine-N,N—di(methylene phosphonic acid)
$HO(CH_2)_2N(CH_2PO_3H_2)_2$ -continued n-hexylamino-N—(isopropylidene phosphonic acid)-N—methylene phosphonic acid
$C_6H_{13}N(C(CH_3)_2PO_3H_2)(CH_2PO_3H_2)$
trihydroxymethylmethylamino-N,N—di(methylene phosphonic acid)
$(HOCH_2)_3(CN(CH_2PO_3H_2)_2$
triethylenetetraamine-N,N,N',N'',N''',N'''—hexa-(methylene phosphonic acid)
$(H_2O_3PCH_2)_2N(CH_2)_2N(CH_2PO_3H_2)—$
$(CH_2)_2N(CH_2PO_3H_2)(CH_2)_2N(CH_2PO_3—H_2)_2$
N—monoethanoldiethylenetriamine-N,N'',N''—tri(methylene phosphonic acid)
$HOCH_2CH_2N(CH_2PO_3H_2)(CH_2)_2NH(CH_2)—_2N(CH_2PO_3H_2)_2$
chlorethyleneamine-N,N—di(methylene phosphonic acid)
$ClCH_2CH_2N(CH_2PO(OH)_2)_2$ (9)
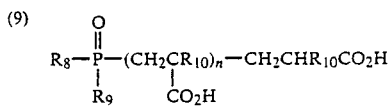

or salts thereof, wherein $R_{10}$ is H, $CH_3$, or $C_2H_5$; $R_8$ is H, a straight or branched alkyl residue having from 1-18 carbon atoms, a cycloalkyl residue having from 5-12 carbon atoms, an aryl residue, an alkylaryl residue, or a residue of the formula:

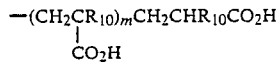

wherein $R_{10}$ has its previous significance and the sum of n+m is an integer of at most 100, or a residue —OX wherein X is hydrogen or a straight or branched alkyl residue having 1-4 carbon atoms and; $R_9$ is a residue —OX, wherein X has its previous significance.

One exemplary compound, falling within the scope of formula (9) is commercially available and is sold as "Belclene 500" from Ciba Geigy. This molecule has the structure

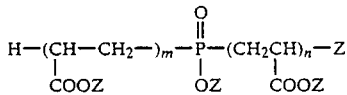

wherein Z is H or a cation, and wherein the sum of n+m is about 2 to 6, and has been referred to as a phosphinocarboxylic acid compound. Compounds of formula (9) above are detailed in U.S. Pat. No. 4,239,648 (Marshall et al.), the entire content of this patent is herewith incorporated by reference to the extent necessary to complete the instant disclosure.

As to the zinc compounds which are useful in accordance with the invention, any water soluble zinc salt which provides $Zn^{++}$ ions may be mentioned. Exemplary zinc salts include zinc nitrate, zinc chloride, zinc sulfate, zinc acetate, alkali metal-zinc phosphate glasses, crystalline alkali metal zinc polyphosphates and the like. Also, other zinc compounds which will liberate $Zn^{++}$ in solution, such as zinc oxide, may be used. The most important criterion is that there be a source of soluble zinc. For example, in addition to adding a zinc salt, this criterion may be satisfied by the use of a process or wastewater stream containing soluble zinc.

The cellulose materials suitable for the present invention are referred to herein as cellulose gum. As is known in the art, cellulose is composed of repeating cellobiose units. The cellobiose units are, in turn, composed of two anhydroglucose units with each anhydroglucose unit containing three hydroxy functionalities. By substituting an alkyl group for some of the H atoms of the hydroxy functional groups, cellulose gum is obtained. The average number of hydroxy groups substituted per anhydroglucose unit is known as the degree of substitution, designated DS. Since three hydroxy functions are contained in each anhydroglucose unit, the highest theoretical DS possible is 3.0

The degree of polymerization of cellulose gum can be expressed by an integer, n, which denotes the number of anhydroglucose units. Since cellulose gums are long chain polymers, their relative chain lengths can be characterized by the number of anhydroglucose units, a molecular weight or a viscosity value.

The phrase cellulose gums in accordance with the invention refers to carboxyloweralkyl cellulose, "modified" carboxyloweralkyl cellulose, and water soluble salts of these materials. The water soluble salts include, inter alia, Na, K, $NH_4$, and Ca, with the Na salt form being preferred.

Carboxyloweralkyl cellulose, as used herein, refers to cellulose polymers in which some of the H atoms of the hydroxy functional groups of the cellulose molecule are replaced with one or more loweralkylcarboxy groups having from 2-4 carbon atoms. For instance, the H atoms of the hydroxy functions may be replaced by carboxymethyl ($CH_2COOH$), carboxyethyl ($CH_2CH_2COOH$), or carboxypropyl ($CH_2CH_2CH_2COOH$). Further, the alkyl groups themselves may include substituents, such as other hydroxy functions. Examples of the latter include, for instance, carboxy 2-hydroxyethyl ($CH(OH)CH_2COOH$) and carboxy 2-hydroxypropyl ($CH_2CH(OH)CH_2COOH$).

"Modified" carboxyloweralkyl cellulose refers to carboxy-loweralkyl cellulose molecules as defined above, which, in addition to the replacement of a lower alkyl carboxy group on one or more of the H atoms on the hydroxy functional groups, include a "second" functional group substituted for some of the H atoms of the remaining hydroxy functional groups of the anhydroglucose unit. These "second" functional groups may comprise a substituted or non-substituted lower alkyl group having from 1 to 4 carbon atoms, e.g., methyl, ethyl, propyl, hydroxyethyl, 2-hydroxypropyl, butyl, or 2-hydroxybutyl.

The cellulose gums may be prepared by well known methods. For instance, the sodium salt of the carboxymethyl derivative is produced by reacting alkali cellulose with sodium monochloracetate. The sodium salts of the other carboxyloweralkyl species are similarly produced by reacting the alkali cellulose material with sodium monochlorpropionate, and sodium monochlorbutyrate respectively.

The cellulose gums suitable for the present invention have a degree of substitution of from about 0.38 to about 2.5 and a molecular weight of from about 50,000 to 250,000. These gums correspond to polymers having degrees of polymerization (n) of from about 300 to 1,200 and a viscosity of less than 20 centipoise (2% gum solution concentration; measured at 25° C. with Brookfield viscometer) to about 1,000 centipoise (2% gum solution concentration; measured at 25° C. with Brookfield viscometer).

The preferred class of cellulose gums are the sodium salts of carboxymethyl cellulose having a viscosity of less than 200 centipoise (2% gum solution concentration, measured at 25° C.). These gums are commercially available from Hercules. The preferred cellulose gum material is designated as the Hercules CMC-7L series and includes Hercules products CMC-7LT, CMC-7L3T, CMC-7L1T, CMC-7L1NT, CMC-7L2NT, etc. The CMC-7L series polymers are believed to have an average molecular weight of less than about 100,000 and a DS of 0.7. The viscosities of such gums range from about 20 centipoises (measured at 25° C. 2% gum concentration) to about 100 centipoises (measured at 25° C. 2% gum concentration). The preferred cellulose gum is sold under the designation "Hercules CMC-7L3T".

In those instances when the system metallurgy comprises copper, such as in admiralty, binary brasses, binary bronzes, and the like, it is desirable to add, to the combined treatment of the present invention, a water soluble copper inhibitor such as an azole compound. Exemplary copper corrosion inhibitors include 1,2,3-triazole compounds having the formula

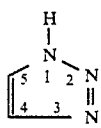

Included within the scope of the invention are N-alkyl substituted 1,2,3-triazole, or a substituted water soluble 1,2,3-triazole where substitution occurs at the 4 and/or 5 position of the ring. The preferred 1,2,3,-triazole is 1,2,3-tolyltriazole of the formula

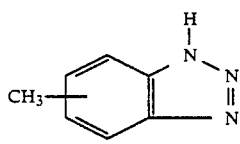

Other exemplary 1,2,3-triazoles include benzotriazole, 4-phenol-1,2,3-triazole, 4-methyl-1,2,3-triazole, 4-ethyl-1,2,3-triazole, 5 methyl-1,2,3-triazole, 5-ethyl-1,2,3-triazole, 5-propyl-1,2,3-triazole, and 5-butyl-1,2,3-triazole. Alkali metal or ammonium salts of these compounds may be used.

Other exemplary copper corrosion inhibitors include thiazole compounds of the formula:

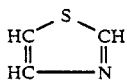

Suitable thiazoles include thiazole, 2-mercaptothiazole, 2-mercaptobenzothiazole, benzothiazole, and the like.

Soluble molybdate compounds may also be used for enhanced corrosion protection. Suitable molybdates include alkali molybdate salts. Exemplary compounds include, inter alia, sodium molybdate, potassium molybdate, lithium molybdate. Also, ammonium molybdate compounds, such as ammonium dimolybdate and ammonium heptamolybdate may be mentioned.

Operable dosage ranges for the method herein, per million parts of the aqueous system, are as follows:

| Zinc compound | 0.1 ppm to about 15 ppm (as Zn ion) |
| --- | --- |
| Organo-phosphorus compound | .2 ppm to about 50 ppm |

-continued

| Cellulose Gum | .5 to about 50 ppm |
| --- | --- |
| Azole (when present) | .2 to about 30 ppm |
| Molybdate, salt (when present) | 0.1 to about 100 ppm (as Molybdate ion) |
| Preferred dosages are: | |
| Zinc compound | 0.1 ppm to about 10 ppm (as $Zn^{+2}$) |
| Organo-phosphorus compound | .2 ppm to about 15 ppm |
| Cellulose Gum | 1 ppm to about 25 ppm |
| Azole (when present) | .2 ppm to about 10 ppm |
| Molybdate (when present) | 0.1 ppm to about 15 ppm (as Molybdate ion) |

It is preferred to feed the organo-phosphorus compound, CMC, and azole together to the system, while separately supplying the $zinc^{2+}$ ion source. Alternatively, all of the ingredients may be combined in, and supplied as, a single product.

Based upon presently available data, when both optimal corrosion protection and scaling control are desired, it is preferred to utilize a treatment composition comprising CMC (Sodium Carboxymethyl cellulose), zinc, 1-hydroxyethylidenediphosphonic acid and tolyltriazole.

The composition of the present invention may be packaged in a single barrel or in two barrels. At present, it is preferred that a double barrel approach be used, with the zinc being provided in a separate barrel.

Contemplated composition concentration ranges are (wt. %):

| Water Soluble Cellulose Gum | 1–8% |
| --- | --- |
| Organo-Phosphorus Compound | 1–5% |
| Copper Corrosion Inhibitor | 0–3% |
| Zinc | 0.5 0.5–1.0% |
| Water | Remainder (to add up to 100%) |

To enhance the solubility of the various composition components, a basic material, such as caustic soda, may be added. Presently available data indicates that an acceptable caustic soda concentration range is from about 5–20% (wt. %).

SPECIFIC EXAMPLES

The invention is further illustrated by the following examples which are intended merely for the purpose of illustration and are not to be regarded as limiting the scope of the invention or the manner in which it may be practiced.

PROCEDURE

In order to evaluate the efficacy of the treatment of the present invention as corrosion and scale control agents for cooling water systems, tests were conducted in a Recirculator Test System. The recirculator system is designed to provide a realistic measure of the ability of a treatment to prevent corrosion and fouling under heat transfer conditions. In this system treated water is circulated by a centrifugal pump through a corrosion coupon by-pass rack into which corrosion coupons (admiralty brass and/or mild steel) are inserted, and past a mild steel (AISI-1010) heat exchanger tube contained in a plexiglass block. The heat exchanger tube is fitted with an electrical heater so that the heat load on the tube can be varied and controlled in the 0 to 16,000 BTU/ft²/hr range. The water velocity past the corrosion coupons and heat exchanger tube is equivalent at any given flow rate and can be controlled anywhere from 0 to 4.5 ft/sec.

The pH and temperature of the circulating water are automatically controlled. The treated water is prepared by chemical addition to deionized water. Provisions for continuous make-up and blowdown are made by pumping fresh treated water from supply tanks to the sump of the unit, with overflow from the sump serving as blowdown. The total system volume of the recirculating system is about 11 liters. The circulating water is aerated to insure oxygen saturation.

Corrosion rates are determined by exposing precleaned and weighed metal specimens for a specified period of time, after which they are removed, cleaned and reweighed. Corrosion rates are calculated by a weight loss method. This weight loss for the specified period is utilized to compute a corrosion rate, and is reported as mils per year (mpy).

EXAMPLE I

Recirculator studies were used to demonstrate the unique and unexpected results given by compositions of the present invention. The studies were conducted in a pH=8.5 cooling water system supersaturated with respect to calcium carbonate, containing: 600 ppm calcium (as ppm $CaCO_3$), 200 ppm magnesium (as ppm $CaCO_3$) and 230 ppm "M" alkalinity (as ppm $CaCO_3$). The cooling water was fed to the system at the rate of one system volume per day; this is equivalent to a retention time of 1.4 day (75% depletion). The bulk circulating water was maintained at T=120° F. The water velocity past both the corrosion coupons and heat exchanger tube was maintained at 1.5 ft./sec. A mild steel (AISI-1010) heat exchanger tube was used as the heat transfer surface; the heat load (heat flux) on the tube was 16,000 $BTU/ft^2/hr$. The aforementioned water chemistry and test conditions makes this sytem highly prone to scaling and difficult to treat with respect to mild steel corrosion. Results from these studies are summarized in Table-1.

TABLE 1

| | | Treatment | | | | | Corrosion Rate, mpy | | |
|---|---|---|---|---|---|---|---|---|---|
| | Polymer | ppm HEDP | ppm $Zn^{+2}$ | ppm TTA | ppm MBT | ppm $Na_2MoO_4$—$.2H_2O$ | ppm Total Treatment | Mild Steel (AISI-1010) | Admiralty Brass | Remarks (directed toward mild steel heat exchanger) |
| 1 | No polymer | 6 | 2 | — | — | — | 8 | 29 | 1 | Severe corrosion and scaling of heat exchanger tube. |
| 2 | 15 ppm CMC-7L3T | 6 | 2 | — | — | — | 23 | 3.2 | 0.8 | Heat exchanger tube free of corrosion and deposition. |
| 3 | No polymer | 17.3 | 5.7 | — | — | — | 23 | 11.1 | 0.8 | Severe scaling and under-deposit (pitting) corrosion of heat exchanger tube. |
| 4 | 30 ppm CMC-7L3T | 17.3 | 5.7 | — | — | — | 53 | 2.4 | 0.7 | Heat exchanger tube free of corrosion and deposition. |
| 5 | No polymer | 39.75 | 13.25 | — | — | — | 53 | 9 | 0.3 | Severe scaling and under-deposit corrosion of heat exchanger tube. |
| 6 | 15 ppm CMC-7L3T | 6 | 2 | 5 | — | — | 28 | 1.5 | 0.8 | No significant corrosion or deposition of heat exchanger tube. |
| 7 | 15 ppm CMC-7L3T | — | 2 | — | — | — | 17 | 6 | 1.4 | Severe scaling of heat exchanger tube; some under-deposit corrosion. |
| 8 | 15 ppm CMC-7L3T | 6 | — | — | — | — | 21 | 5.8 | 1.4 | Localized corrosion of heat exchanger tube; no significant deposition. |
| 9 | 15 ppm "A" | 6 | 2 | — | — | — | 23 | 24 | 0.5 | Severe scaling and under-deposit corrosion of heat exchanger tube. |
| 10 | 15 ppm "A" | 6 | 2 | 5 | — | — | 28 | 6.8 | 0.7 | Severe scaling and under-deposit corrosion of heat exchanger tube. |
| 11 | 15 ppm "B" | 6 | 2 | — | — | — | 23 | 14.3 | 0.5 | Severe scaling of heat exchanger tube. |
| 12 | 15 ppm "B" | 6 | 2 | 5 | — | — | 28 | 3.5 | 0.8 | Severe scaling of heat exchanger tube. |
| 13 | 15 ppm "C" | 6 | 2 | — | — | — | 23 | 17 | 0.8 | Thin, uniform deposit covering heat exchanger tube. Severe localized corrosion of heat exchanger tube. |
| 14 | 15 ppm "D" | 6 | 2 | — | — | — | 23 | 14.5 | 0.8 | Severe scaling and under-deposit corrosion of heat exchanger tube. |
| 15 | 15 ppm "E" | 6 | 2 | — | — | — | 23 | 3.8 | 0.8 | Severe scaling of heat exchanger tube; some under-deposit corrosion. |
| 16 | 15 ppm "F" | 6 | 2 | — | — | — | 23 | 14.8 | 0.7 | Severe scaling of heat exchanger tube; some under-deposit corrosion. |
| 17 | 15 ppm "G" | 6 | 2 | — | — | — | 23 | 10.5 | 1.0 | Severe scaling and under-deposit corrosion of heat exchanger tube. |
| 18 | No polymer | 6 | 2 | — | 5 | 5 | 18 | 1.6 | 1 | Thin, uniform deposit covering heat exchanger tube; no significant corrosion. |

TABLE 1-continued

| | Treatment | | | | | | Corrosion Rate, mpv | | |
|---|---|---|---|---|---|---|---|---|---|
| | Polymer | ppm HEDP | ppm Zn$^{+2}$ | ppm TTA | ppm MBT | ppm Na$_2$MoO$_4$—.2H$_2$O | ppm Total Treatment | Mild Steel (AISI-1010) | Admiralty Brass | Remarks (directed toward mild steel heat exchanger) |
| 19 | No polymer | 10.08 | 3.36 | — | 8.41 | 8.41 | 30.98 | 2.3 | 1.2 | Severe scaling of heat exchanger tube; some under-deposit corrosion. |
| 20 | 15 ppm CMC-7L3T | 2.4 | 2 | — | 5 | 5 | 29.4 | 1.5 | 0.7 | Heat exchanger tube free of corrosion and deposition. |

CMC-7L3T = Sodium carboxymethylcellulose polymer
DS = 0.7
Viscosity of 2% solution at 25° C. = 30 Centipoises
Polymer A = Polymethacrylic acid, sodium salt
MW = 6,000 to 8,000
Polymer B = Sulfonated polystyrene
MW = 70,000
Polymer C = Diisobutylene/maleic anhydride copolymer
MW = 1,000 to 2,400
Polymer D = Partially hydrolized polyacrylamide
MW = 5,000
Polymer E = Polymaleic anhydride
MW = 1,000
Polymer F = Polyacrylic acid
MW = 5,000
Polymer G = 2-Hydroxypropylmethylcellulose
DS - 1.8 to 2.0
Viscosity of 2% solution at 20° C. = 5 Centipoises
HEDP = hydroxyethylidene diphosphonic acid
TTA = 1,2,3-tolyltriazole
MBT = mercaptobenzothiazole
Zn = ZnSO$_4$.H$_2$O

DISCUSSION-TABLE I

As evidenced by Tests, 1, 3 and 5, a combination of zinc (Zn) and 1-hydroxyethylidene-1,1 diphosphonic acid (HEDP) did not effectively control corrosion and scaling. In sharp contrast, a sodium carboxymethylcellulose/Zn/HEDP composition of the present invention provided excellent corrosion and scale control simultaneously, as evidenced by Tests, 2, 4 and 6. Furthermore, a comparison of Tests 2, and 4, to Tests 1,3 and 5,7 and 8 demonstrates that the combinations of the present invention are synergistic in their ability to control scaling and mild steel corrosion.

To further demonstrate the uniqueness and totally unexpected behavior of the composition of the present invention, a wide variety of polymeric dispersants known in the art were evaluated as substitutes for the cellulose gum polymer of the present invention. As can be seen from Tests 9 through 16, substitution for the cellulose gum polymer component of the present invention resulted in significant increases in mild steel corrosion and/or scaling deposition. The uniqueness of the cellulose gum combinations is further evidenced by Test-17, in which the cellulose gum polymer was replaced with a 2-hydroxypropylmethylcellulose polymer. As shown by Test-17, the combination containing 2-hydroxypropylmethylcellulose did not provide acceptable scale inhibition or mild steel corrosion control. It is accordingly apparent that the carboxy function is important in achieving acceptable performance.

Tests 18, 19 and 20 serve to illustrate the enhanced performance obtained when cellulose gum is used in combination with a molybdate containing formulation.

EXAMPLE II

Additional recirculator studies were performed with a number of compositions of the present invention in a variety of cooling waters and under various conditions of heat load and water velocity to demonstrate the general scope and applicability of the present invention. The treatment programs tested are summarized after Table-II. The results of these tests along with the water chemistries, water velocities, and heat loads employed in the studies are presented in Table II. As in Example I, the temperature of the circulating water was 120° F., the make-up rate was 1 system volume per day, and the heat exchanger tube was of mild steel metallurgy (AISI-1010). All of the water chemistries utilized in the studies were supersaturated with calcium carbonate. Additionally, the water chemistries and test conditions were such that the system was prone to deposition from both chemical and natural scales.

TABLE-II

| | Water Chemistry | | | | | | | Corrosion Rate, mpy | | |
|---|---|---|---|---|---|---|---|---|---|---|
| Example Treatment | ppm Ca as CaCO$_3$ | ppm Mg as CaCO$_3$ | ppm "M" Alkalinity as CaCO$_3$ | ppm SiO$_2$ | pH | Water Velocity ft/sec | Heat Flux BTU/ft$^2$/hr | Mild Steel | Admiralty Brass | Remarks |
| (1) A | 600 | 200 | 200 | 0 | 8.5 | 3 | 8,000 | 0.7 | 0.3 | Heat exchanger tube free of corrosion and deposition. |
| (2) A | 900 | 300 | 250 | 0 | 8.6 | 3 | 8,000 | 1.0 | 0.9 | Same as 1. |
| (3) A | 900 | 300 | 250 | 150 | 8.6 | 3 | 8,000 | 1.3 | 1.2 | Same as 1. |
| (4) A | 1,500 | 500 | 250 | 0 | 8.5 | 3 | 8,000 | 1.0 | 1.3 | Same as 1. |
| (5) B | 900 | 300 | 250 | 0 | 8.5 | 3 | 8,000 | 3.5 | 0.8 | Same as 1. |
| (6) C | 900 | 300 | 265 | 0 | 8.5 | 3 | 8,000 | 2.5 | 0.5 | Same as 1. |
| (7) D | 900 | 300 | 240 | 0 | 8.5 | 3 | 8,000 | 1.2 | 0.3 | Same as 1. |
| (8) E | 900 | 300 | 250 | 0 | 8.5 | 3 | 8,000 | 1.7 | 0.7 | Same as 1. |
| (9) F | 900 | 300 | 250 | 0 | 8.5 | 3 | 8,000 | 2.3 | 0.7 | Same as 1. |
| (10) G | 600 | 200 | 180 | 0 | 8.0 | 1.5 | 16,000 | 0.8 | NP | Same as 1. |
| (11) H | 600 | 200 | 300 | 0 | 9.0 | 1.5 | 16,000 | 0.7 | NP | Same as 1. |

TABLE-II-continued

| | | | | | | | | | | | |
|---|---|---|---|---|---|---|---|---|---|---|---|
| (12) I | 600 | 200 | 250 | 0 | 8.5 | 1.5 | 16,000 | 0.6 | NP | Same as 1 |
| (13) J | 1,000 | 330 | 280 | 0 | 9.0 | 1.5 | 16,000 | 1.4 | NP | Same as 1. |

NP = Not present

| Treatments | | Concentration |
|---|---|---|
| A. | 1-Hydroxyethylidene-1,1 diphosphonic acid (HEDP) | 6 ppm |
| | Tolyltriazole (TTA) | 5 ppm |
| | Zinc Sulfate, monohydrate | 5.5 ppm - (2 ppm $Zn^{-2}$) |
| | Sodium carboxymethylcellulose, CMC-7LT[1] | 15 ppm |
| B. | Nitrilo-tri (methylene phosphonic acid) | 6 ppm |
| | Benzotriazole (BZT) | 5 ppm |
| | Zinc Sulfate, monohydrate | 5.5 ppm - (2 ppm $Zn^{-2}$) |
| | Sodium carboxymethylcellulose, CMC-7LT[2] | 15 ppm |
| C. | Hexamethylene diamine-N,N,N',N'—tetra (methylene phosphonic acid) | 6 ppm |
| | 2-Mercaptobenzothiazole | 5 ppm |
| | Zinc Sulfate, monohydrate | 5.5 ppm - (2 ppm $Zn^{-2}$) |
| | Sodium carboxymethylcellulose, CMC-7LT[1] | 15 ppm |
| D. | 1-Hydroxyethylidene-1,1 diphosphonic acid | 3 ppm |
| | Nitrilo-tri (methylene phosphonic acid) | 3 ppm |
| | 2-Mercaptobenzothiazole | 5 ppm |
| | Zinc Sulfate, monohydrate | 5.5 ppm |
| | Sodium carboxymethylcellulose, CMC-7L3T[2] | 15 ppm |
| E. | 2-Phosphono-butane 1,2,4-tricarboxylic acid | 6 ppm |
| | Tolyltriazole | 5 ppm |
| | Zinc Sulfate, monohydrate | 5.5 ppm - (2 ppm $Zn^{-2}$) |
| | Sodium carboxymethylcellulose, CMC-7L3T[2] | 15 ppm |
| F. | Phosphino carboxylic acid - (Belclene "500") | 3 ppm |
| | 1-Hydroxyethylidene 1,1 diphosphonic acid | 3 ppm |
| | Tolyltriazole | 5 ppm |
| | Zinc Sulfate, monohydrate | 5.5 ppm - (2 ppm $Zn^{-2}$) |
| | Sodium carboxymethylcellulose, CMC-7LT[1] | 15 ppm |
| G. | 1-Hydroxyethylidene 1,1 diphosphonic acid | 6 ppm |
| | Tolyltriazole | 3 ppm |
| | Zinc Sulfate, monohydrate | 8.25 ppm - (3 ppm $Z^{-2}$) |
| | Sodium carboxymethylcellulose, CMC-7L3T[2] | 15 ppm |
| H. | 1-Hydroxyethylidene-1,1 diphosphonic acid | 6 ppm |
| | Tolyltriazole | 3 ppm |
| | Zinc Sulfate, monohydrate | 5.5 ppm - (2 ppm $Zn^{-2}$) |
| | Sodium carboxymethylcellulose, CMC-7L3T[2] | 15 ppm |
| I. | 2-Phosphono-butane 1,2,4-tricarboxylic acid | 2.5 ppm |
| | 1-Hydroxyethylidene 1,1-diphosphonic acid | 6 ppm |
| | Tolyltriazole | 3 ppm |
| | Zinc Sulfate, monohydrate | 5.5 ppm - (2 ppm $Zn^{-2}$) |
| | Carboxymethylcellulose, CMC-7L3T[2] | 10 ppm |
| J. | 1-Hydroxyethylidene 1,1,-diphosphonic acid | 6 ppm |
| | Tolyltriazole | 3 ppm |
| | Zinc Sulfate, monohydrate | 5.5 ppm - (2 ppm $Zn^{-2}$) |
| | Sodium carboxymethylcellulose | 20 ppm |

[1] CMC-7LT, Hercules, DS = 0.7, Viscosity of 2% soln. at 25° C. = 30 - 100 cps
[2] CMC-7L3T, Hercules, DS = 0.7, Viscosity of 2% soln. at 25° C. = 30 cps max.

Table-II clearly indicates that the composition of the present invention can provide an excellent degree of corrosion protection without attendant scale deposition under a wide variety of conditions. For instance, it is noted that the compositions of the present invention are efficacious in water systems wherein calcium and magnesium silicates are likely to form (see run #3 - Table II).

EXAMPLE-3

To further illustrate the unique and unexpected behavior of the compositions of the present invention, recirculator studies were conducted in deionized water, at pH = 8.5. In these studies the water velocity past the corrosion coupons and mild steel heat exchanger tube were controlled to give 3 ft/sec. The heat load (heat flux) on the heat exchanger tube was maintained at 8,000 BTU/ft$^2$/hr. As in the previous examples, the temperature of the circulating water was 120° F. and the make-up rate was 1 system volume per day.

As can be seen from Table-3, a composition of the present invention provided excellent corrosion control in a water void of scale forming ions. Whereas, the same combination without the cellulose gum polymer was not only ineffective, but actually accelerated mild steel corrosion.

TABLE 3

| Treatment | | | | Mild Steel Corrosion | |
|---|---|---|---|---|---|
| Polymer | ppm HEDP | ppm TTA | ppm $Zn^{-2}$ | Rate, in mpy | Remarks |
| 1 No Treatment | | | | 150 | Severe Corrosion of Heat Transfer |

TABLE 3-continued

| Treatment | | | | Mild Steel Corrosion | |
|---|---|---|---|---|---|
| Polymer | ppm HEDP | ppm TTA | ppm $Zn^{+2}$ | Rate. in mpy | Remarks |
| 2 No Polymer | 6 | 3 | 2 | 210 | Surface Same as 1 |
| 3 10 ppm CMC-7L3T | 6 | 3 | 2 | 0.9 | No significant corrosion |

HEDP = 1-hydroxyethylidene 1,1-diphosphonic acid
TTA = tolyltriazole
CMC-7L3T = Sodium carboxymethylcellulose Whereas I have shown and described herein certain embodiments of the present invention, it is intended that there be covered as well any change or modification therein which may be made without departing from the spirit and scope of the invention.

I claim:

1. Method of treating cooling water systems having a pH of about 8 or greater so as to inhibit scale formation on, and corrosion of, metallic parts in contact with said water system, said method comprising the steps of adding to said cooling water system, based on one million parts of said cooling water system, (1) a water soluble zinc compound adapted to liberate from about 0.1 parts per million to about 15 parts per million of $Zn^{+2}$ ions in solution;

(2) from about 0.5 to about 50 parts per million of a water soluble sodium carboxymethylcellulose having a viscosity of less than about 200 centipoise (2% gum solution concentration, measured at 25° C.); and (3) from about 0.2 to about 50 parts per million of an organo-phosphorus acid compound or water soluble salt thereof; said organo-phosphorus acid compound comprising a member or water soluble salt of such member selected from the group of compounds represented by the formulas

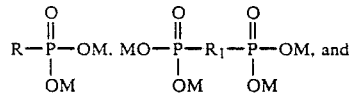

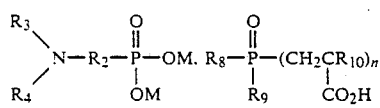

wherein R is lower alkyl having from about one to six carbon atoms, substituted lower alkyl of 1-6 carbon atoms, a mononuclear aryl radical, or substituted mononuclear aromatic; M is a water soluble cation; $R_1$ is alkylene having from 1 to about 12 carbon atoms or a substituted alkylene having from about 1 to about 12 carbon atoms; $R_2$ is a lower alkylene having from about one to four carbon atoms, or an amine or hydroxy substituted lower alkylene; $R_3$ is H, OH, $NH_2$, substituted amino, an alkyl having from one to six carbon atoms, a substituted alkyl of from one to six carbon atoms (e.g., OH, $NH_2$ substituted), a mononuclear aromatic radical and a substituted mononuclear aromatic radical (e.g., OH, $NH_2$ substituted); $R_4$ is $R_3$ or the group represented by the formula

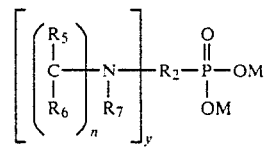

where $R_5$ and $R_6$ are each hydrogen, lower alkyl of from about one to six carbon atoms, a substituted lower alkyl (e.g., OH, $NH_2$ substituted), hydrogen, hydroxyl, amino group, substituted amino group, a mononuclear aromatic radical, and a substituted mononuclear aromatic radical (e.g., OH and amine substituted); $R_7$ is $R_5$, $R_6$, or the group $R_2$—$PO_3M_2$ ($R_2$ is as defined above); n is a number of from 1 through about 15; y is a number of from about 1 through about 14; $R_{10}$ is H, $CH_3$, or $C_2H_5$; $R_8$ is H, a straight or branched alkyl residue having from 1-18 carbon atoms, a cycloalkyl residue having from 5-12 carbon atoms, an aryl residue, an alkylaryl residue, or a residue of the formula:

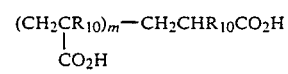

wherein $R_{10}$ has its previous significance and the sum of n+m is an integer of at most 100, or a residue —OX wherein X is hydrogen or a straight or branched alkyl residue having 1-4 carbon atoms and; $R_9$ is a residue —OX, wherein X has its previous significance.

2. Method as defined in claim 1 wherein said organo-phosphorus acid comprises 1-hydroxyethylidene 1,1-diphosphonic acid.

3. Method as defined in claim 1 wherein said organo-phosphorus acid compound comprises 2-phosphonobutane 1,2,4-tricarboxylic acid.

4. Method as defined in claim 1 wherein said organo-phosphorus acid compound comprises nitrilo-tris(-methylene phosphonic acid).

5. Method as defined in claim 1 wherein said organo-phosphorus acid compound comprises a phosphinocarboxylic acid compound having the formula

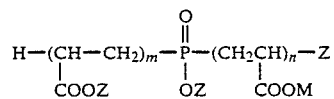

wherein Z is H or a cation, and wherein the sum of n+m=2 to 6.

6. Method as defined in claim 1 wherein said organo-phosphorus acid compound comprises hexamethylene diamine-N,N,N',N'-tetra (methylene phosphonic acid).

7. Method as defined in claim 1 wherein said organo-phosphorus acid compound comprises a mixture of 1-hydroxyethylidene 1,1-diphosphonic acid and 2-phosphonobutane 1,2,4-tricarboxylic acid.

8. Method as defined in claim 1 further comprising, adding to said water system, an effective amount of a corrosion inhibitor compound selected from the group consisting of effective azole compounds and effective molybdate compounds.

9. Method as defined in claim 8 wherein said corrosion inhibitor compound comprises tolyltriazole.

10. Method as defined in claim 8 wherein said corrosion inhibitor compound comprises mercaptobenzothiazole.

11. Method as defined in claim 1 wherein said organo-phosphorus acid compound (3) is added in an amount of between about 0.2 to about 15 ppm, said zinc compound (1) being added in an amount of between about 0.1 to about 10 ppm, and said sodium carboxymethylcellulose (2) being added in an amount of between about 1 ppm to about 25 ppm.

* * * * *

UNITED STATES PATENT AND TRADEMARK OFFICE
CERTIFICATE OF CORRECTION

PATENT NO. : 4,497,713
DATED : February 5, 1985
INVENTOR(S) : Gary E. Geiger

It is certified that error appears in the above-identified patent and that said Letters Patent is hereby corrected as shown below:

On the first page of the patent, the assignee should be added as follows:

Assignee: Betz Laboratories, Inc., Trevose, Pa.

Signed and Sealed this

Twenty-second Day of October 1985

[SEAL]

*Attest:*

*Attesting Officer*

DONALD J. QUIGG

*Commissioner of Patents and Trademarks—Designate*